US008165354B1

(12) United States Patent
Zhao (10) Patent No.: US 8,165,354 B1
(45) Date of Patent: Apr. 24, 2012

(54) FACE RECOGNITION WITH DISCRIMINATIVE FACE ALIGNMENT

(75) Inventor: Ming Zhao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 941 days.

(21) Appl. No.: 12/050,872

(22) Filed: Mar. 18, 2008

(51) Int. Cl.
    G06K 9/00 (2006.01)
    G06K 9/46 (2006.01)
    G06K 9/62 (2006.01)
    G06K 9/32 (2006.01)

(52) U.S. Cl. ........ 382/118; 382/203; 382/209; 382/228; 382/294

(58) Field of Classification Search .................. 382/118, 382/203, 209, 228, 294
    See application file for complete search history.

(56) References Cited

U.S. PATENT DOCUMENTS

| | | | | |
|---|---|---|---|---|
| 5,710,833 | A * | 1/1998 | Moghaddam et al. | 382/228 |
| 5,799,098 | A * | 8/1998 | Ort et al. | 382/125 |
| 7,058,209 | B2 * | 6/2006 | Chen et al. | 382/117 |
| 7,120,279 | B2 * | 10/2006 | Chen et al. | 382/118 |
| 7,295,709 | B2 * | 11/2007 | Cootes et al. | 382/199 |
| 7,587,068 | B1 * | 9/2009 | Steinberg et al. | 382/118 |
| 7,689,011 | B2 * | 3/2010 | Luo et al. | 382/118 |
| 2001/0028731 | A1 * | 10/2001 | Covell et al. | 382/118 |
| 2005/0169505 | A1 * | 8/2005 | Xia et al. | 382/125 |
| 2006/0153432 | A1 * | 7/2006 | Lo et al. | 382/124 |
| 2006/0253491 | A1 * | 11/2006 | Gokturk et al. | 707/104.1 |
| 2007/0046426 | A1 * | 3/2007 | Ishibashi | 340/5.52 |
| 2008/0013798 | A1 * | 1/2008 | Ionita et al. | 382/118 |
| 2008/0075336 | A1 * | 3/2008 | Luo et al. | 382/118 |
| 2008/0273767 | A1 * | 11/2008 | Lo et al. | 382/124 |
| 2008/0298642 | A1 * | 12/2008 | Meenen | 382/115 |
| 2009/0169072 | A1 * | 7/2009 | Lo et al. | 382/125 |
| 2009/0180672 | A1 * | 7/2009 | Ishiyama | 382/118 |
| 2010/0013832 | A1 * | 1/2010 | Xiao et al. | 345/420 |
| 2010/0316265 | A1 * | 12/2010 | Nakanowatari et al. | 382/118 |

OTHER PUBLICATIONS

Lienhart, Rainer et al., An Extended Set of Haar-Like Features for Rapid Object Detection, In: Proceedings of IEEE International Conference on Image Processing, vol. 1, (2002), pp. 900-903.
Ballard, Dana H. et al., Computer Vision, Chapter 10, pp. 340-351, Prentice-Hall, 1982.
Rogers, Mike et al., Robust Active Shape Model Search, In Proceedings of the European Conference on Computer Vision, No. IV, pp. 517-530, Copenhagen, Denmark, May, 2002.
Gross, Ralph et al., Generic vs. Person Specific Active Appearance Models, In British Machine Vision Conference, Sep. 2004, pp. 457-466.
Borenstein, Eran et al., Class-Specific, Top-Down Segmentation, In ECCV, pp. 109-122, Copenhagen, Denmark, May 28-31, 2002.

(Continued)

*Primary Examiner* — Kathleen Y Dulaney (74) *Attorney, Agent, or Firm* — Sterne, Kessler, Goldstein & Fox PLLC (57) ABSTRACT

The present invention relates to systems and methods for face recognition. In an embodiment, a system for face recognition includes a face alignment module, a signature extractor and a recognizer. In another embodiment, a method for face recognition is provided. The method includes extracting signature features of a face in an image based upon face alignment localization. The method also includes generating reconstruction errors based upon the face alignment localizations. Face alignment models may be used. The method further includes identifying a person from the face in the image. According to a further embodiment, direct mixture recognition may be performed. According to another embodiment, iterative mixture recognition may be performed.

19 Claims, 8 Drawing Sheets

OTHER PUBLICATIONS

Bolme, David S. et al., The CSU Face Identification Evaluation System: Its Purpose, Features, and Structure, In Third International Conference on Computer Vision Systems, pp. 304-313, 2003.
Cootes, Timothy F. et al., Active Appearance Models, IEEE Transactions on Pattern Analysis and Machine Intelligence, vol. 23, No. 6, Jun. 2001, pp. 681-685.
Cristinacce, D. et al., A Comparison of Shape Constrained Facial Feature Detectors, In: Proceedings of IEEE International Conference on Automatic Face and Gesture Recognition (2004), pp. 375-380.
Viola, Paul et al., Robust Real Time Object Detection, In IEEE ICCV Workshop on Statistical and Computational Theories of Vision, Vancouver, Canada, Jul. 13, 2001, p. 747.
Cootes, T.F. et al., Statistical Models of Appearance for Computer Vision, Technical Report, www.isbe.man.ac.uk/~bim/refs.html (2001), pp. 1-120.
Phillips, P. Jonathon et al., The FERET Evaluation Methodology for Face-Recognition Algorithms, IEEE Transactions on Pattern Analysis and Machine Intelligence, 22 (2000) pp. 1090-1104.
Davies, Rhodri H. et al., A Minimum Description Length Approach to Statistical Shape Modeling, IEEE Transactions on Medical Imaging, 21:525-537, 2002.
Cootes, T.F. et al., Constrained Active Appearance Models, In Proceedings of IEEE International Conference on Computer Vision, pp. 748-754, Vancouver, Canada, Jul. 2001.
Ginneken, BRAM van et al., Active Shape Model Segmentation with Optimal Features, IEEE Transactions on Medical Imaging 21 (2002) pp. 924-933.
Yan, Shuicheng et al., Ranking Prior Likelihood Distribution for Bayesian Shape Localization Framework, IEEE International Conference On Computer Vision, vol. 1, pp. 51-58, Nice, France, Oct. 2003.
Hill, Andrew et al., A Framework for Automatic Landmark Identification Using a New Method of Nonrigid Correspondence, IEEE Transactions on Pattern Analysis and Machine Intelligence, vol. 22, No. 3, Mar. 2000, pp. 241-251.
Chellappa, Rama et al., Human and Machine Recognition of Faces: A Survey, Proceedings of the IEEE, vol. 83, No. 5, May 1995, pp. 705-740.
Zhao, W. et al., Face Recognition: A Literature Survey, ACM Computing Surveys, vol. 35, No. 4, Dec. 2003, pp. 399-458.
Bailly-Baillere, Enrique et al., The BANCA Database and Evaluation Protocol, In $4^{th}$ International Conference on Audio- and Video- Based Biometric Person Authentication, Surrey, Berlin, 2003, Springer-Verlag, pp. 625-638.
Liu, CE et al., Hierarchical Shape Modeling for Automatic Face Localization, In Proceedings of the European Conference on Computer Vision, No. II, Copenhagen, Denmark, May 2002, pp. 687-703.
Cootes, T.F. et al., Active Shape Models: Their Training and Application, CVGIP: Image Understanding, vol. 61, No. 1, Jan. 1995, pp. 38-59.
Zhao, Ming et al., Face Alignment With Unified Subspace Optimization of Active Statistical Models, In The $7^{th}$ IEEE International Conference on Automatic Face and Gesture Recognition, Southampton, UK, Apr. 2006, pp. 67-72.
Borenstein, Eran et al., Combining Top-Down and Bottom-Up Segmentation, In Proceedings of the 2004 IEEE Computer Society Conference on Computer Vision and Pattern Recognition Workshops, vol. 4, 8 pages.
Yan, Shuicheng et al., Texture-Constrained Active Shape Models, May 2002, pp. 107-113.

* cited by examiner

BOTTOM-UP APPROACH

FIG. 1

TOP-DOWN APPROACH

DIRECT MIXTURE RECOGNITION

FACE RECOGNITION WITH DISCRIMINATIVE FACE ALIGNMENT

BACKGROUND

1. Field of the Invention

Embodiments of the present invention relate to face recognition.

2. Background Art

Figure 1:
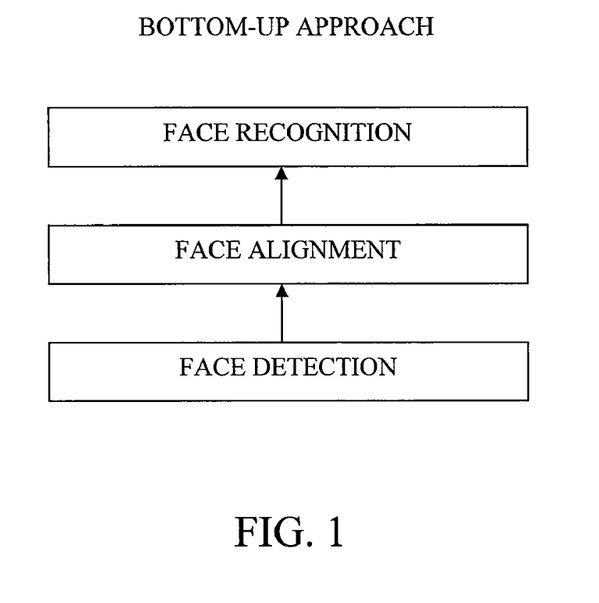
FIG. 1 illustrates bottom-up approach to face recognition.
Figure 2:
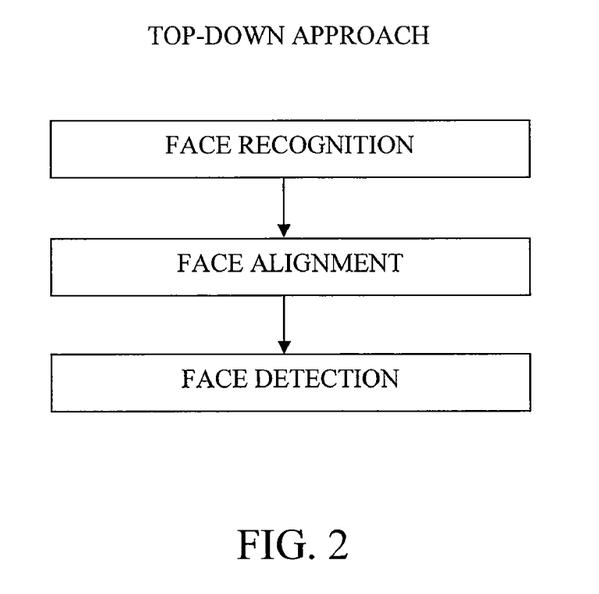
FIG. 2 illustrates top-down approach to face recognition.

Face recognition uses computers to recognize a person from a digital image or a video frame. Face recognition can be used for a variety of purposes including identification, security, law enforcement, and digital photography and video. A number of methods have been developed for face recognition. For instance, a typical automatic face recognition (AFR) system is composed of three parts or levels: face detection, face alignment and face recognition. Given images containing faces, face detection locates a face, face alignment locates key feature points of the face, and face recognition determines whose face it is. Many algorithms have been proposed for human face recognition. However, these algorithms have focused only on each separate part of a face recognition system. Conventionally, these three parts are processed as follows: face detection is performed first, detection results are then passed to face alignment, and then results of face alignment are passed to face recognition. This is a bottom-up approach, as shown in FIG. 1. Another approach is the top-down approach, as shown in FIG. 2, which operates in a reverse order than a bottom-up approach.

In a typical bottom-up approach, each part or level provides data to the next level. It is a data-driven approach. This approach may use only class-independent information or information that is not specific to a class of persons. A class may be one or more specific persons to be recognized or identified. Typical bottom-up approaches may not rely on class-specific knowledge. For such AFR systems, face detection and face alignment may not use knowledge about the classes of persons to be recognized.

Also, for a bottom-up approach to be practical, domain-independent processing must be inexpensive and the input data for each part or level must be accurate and yield reliable results for the next level. As face detection and face alignment have become more inexpensive and more reliable, the bottom-up approach has become more dominant. However, there are two inherent problems. First, class-independent face detection and face alignment may fail for some classes of persons to be recognized. Second, if face detection fails to detect the face or if face alignment cannot correctly locate the feature points, the face recognition will usually fail.

Furthermore, with the bottom-up approach, conventional face alignment concentrates on general purpose face alignment (GPFA). It builds the model from faces of many persons other than the persons to be recognized in order to cover the variance of all the faces. Accordingly, it attains the ability of generalization at the cost of specialization. Moreover, GPFA does not consider its higher-level tasks or tasks beyond the immediate part or level. Different tasks may have different requirements. For example, face recognition needs good distinguishable features whereas face animation requires accurate positions of key points.

In the top-down approach, shown in FIG. 2, the higher level guides the lower level. With class-specific knowledge, the top-down approach could perform better for the objects that provide this knowledge. However, there are difficulties with the top-down approach. First, there may be large variations within the classes. If the variations cannot be properly modeled, they will introduce unexpected errors. Second, in order to model the large variations, various models may be used. Problems arise in determining how to choose these models for a particular test example. Third, building a model with class-specific knowledge may require more effort.

BRIEF SUMMARY

Embodiments of the present invention relates to systems and methods for face recognition. In an embodiment, a system for face recognition includes a face alignment module, a signature extractor and a recognizer. The face alignment module can locate feature points of a face in an image using a face alignment model. The signature extractor can generate a reconstruction error. The signature generator can also extract signature features from the face in an image. The recognizer can identify a person from the face in the image.

According to another embodiment, a method for face recognition is provided. The method includes extracting signature features of a face in an image based upon face alignment localization. The extracting may use a face alignment model. The method also includes generating reconstruction errors based upon the face alignment localization. The generating may use the face alignment model. The method further includes identifying a person from the face in the image. This identification may be based upon the extracted signature features and the generated reconstruction errors.

According to a further embodiment, a method for face recognition is provided. This method includes extracting signature features of a face in an image based upon face alignment localization. The extracting may use an individual face alignment model. The method also includes generating reconstruction errors based upon the face alignment localization. The generating may use the individual face alignment model. The method further includes producing an individual alignment result ranking. This ranking may be based upon the extracted signature features and the reconstruction errors. The method also includes repeating the extracting, generating, and producing steps to produce additional individual alignment result rankings. The method includes identifying a person from the face in an image based upon the individual alignment result rankings.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for face recognition. As previously discussed, typical automatic face recognition systems may be composed of three parts or levels: face detection, face alignment and face recognition. As shown in FIGS. 1 and 2, these three parts may be processed in a bottom-up or top-down manner. According to embodiments of the present invention, bottom-up and top-down face recognition may be combined with discriminative face alignment for better results. Discriminative face alignment may incorporate knowledge about classes of persons or individuals to be recognized into the face alignment step. This top-down approach of discriminative face alignment may be combined with a traditional bottom-up approach for face recognition. This is a mixture of top-down and bottom-up, or mixture face recognition.

According to an embodiment, direct mixture recognition may build a discriminative face alignment model only on a set of persons to be recognized rather than from a larger general person group. The subsequent face recognition step will likely be bottom-up. According to another embodiment, iterative mixture recognition may build discriminative face alignment models on each individual person to be recognized. Iterative mixture recognition may work in an iterative manner. For example, face recognition is performed from the results of face alignment in a bottom-up way. Then, face alignment is performed in a top-down way based on the results of face recognition. This process may repeat for any number of iterations.

Figure 3:
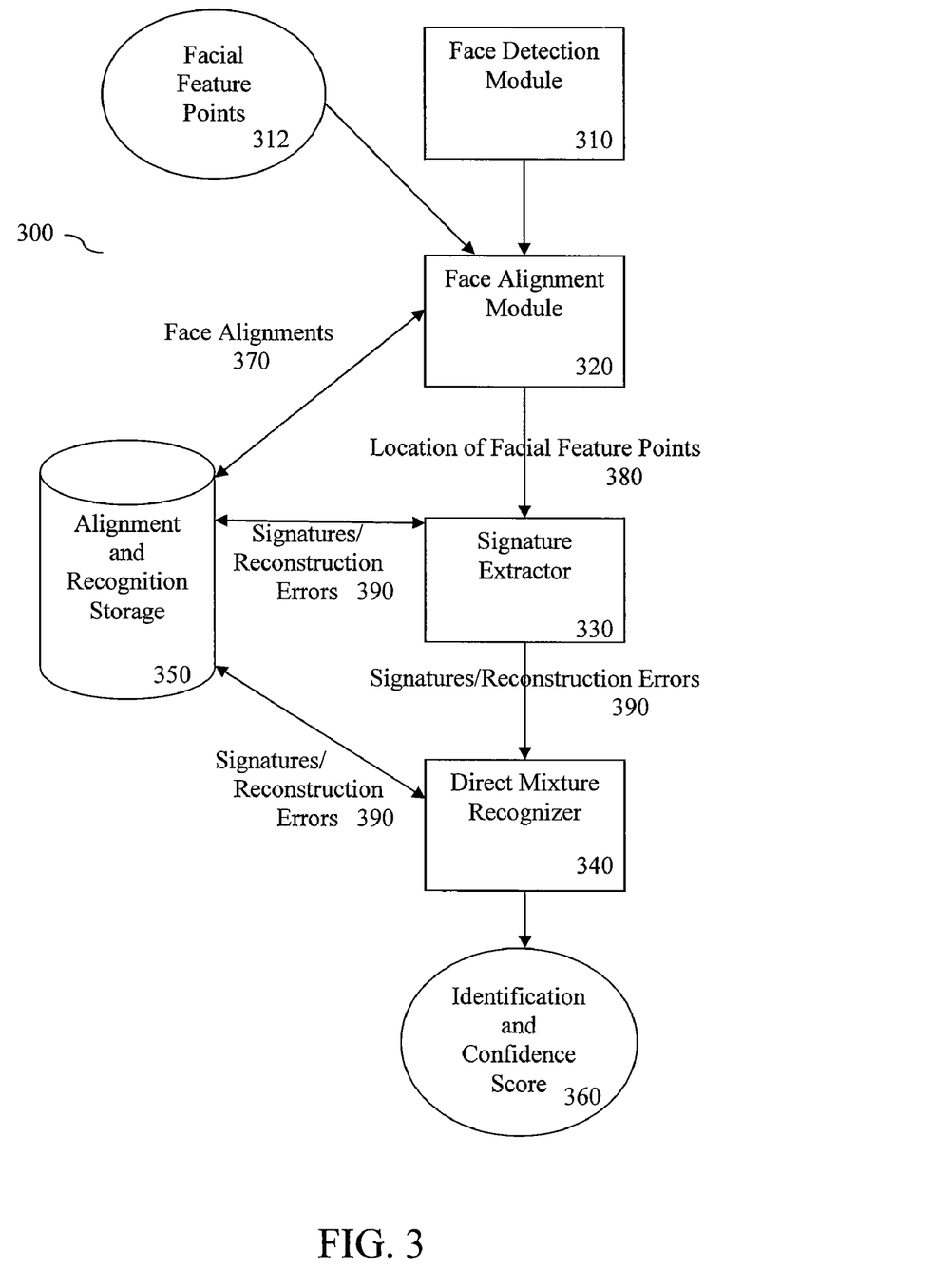
FIG. 3 illustrates a system for face recognition, according to an embodiment of the present invention.

FIG. 3 illustrates an exemplary system 300 for face recognition, according to an embodiment. System 300 includes face detection module 310, face alignment module 320, signature extractor 330, direct mixture recognizer 340 and alignment and recognition storage 350. Face detection module 310 is configured to detect a face or a location of a face. Face detection module can pass this information to the face alignment module 320. Alternatively, face detection module 310 may pass this information to or receive such information from alignment and recognition storage 350. Alignment and recognition storage 350 may be a storage device or storage means. It may store annotated or non-annotated facial feature points, alignment models, signature features or signatures, reconstruction errors, recognition information, and/or any other information related to face detection, face alignment, and/or face recognition.

Face alignment module 320 is configured to perform face alignment. In an embodiment, face alignment module 320 may be configured to locate feature points of a face in one or more images using a face alignment model. A face alignment model may be developed from a general person group. Such a model may be referred to as a general purpose alignment model (GPFA). In another embodiment, a face alignment model may incorporate class-specific knowledge. This class-specific knowledge may include information about a class of persons to be recognized. Such a model may be referred to as a global face alignment model (GLFA). According to a further embodiment, class specific knowledge may include information only for a specific individual or person. Such a model may be referred to as an individual face alignment model (IFA). In yet another embodiment, individual face alignment models may be developed only for a person, a group of persons, or a group of n persons to be recognized. In an embodiment, face alignment may be performed based upon face alignment localization. In another embodiment, global face alignment localization may be performed using global face alignment models.

Figure 4:
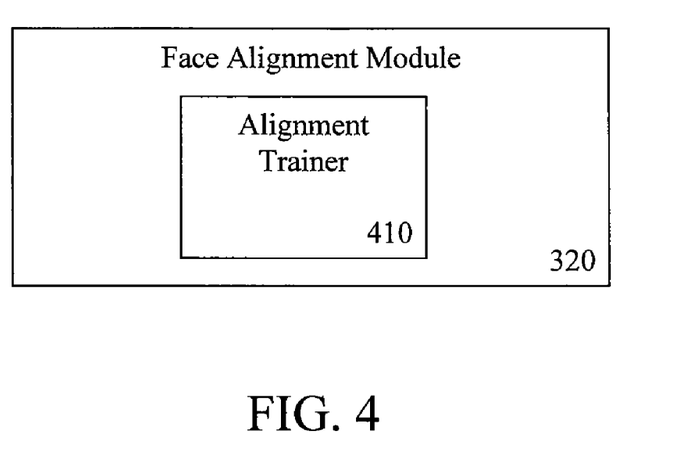
FIG. 4 illustrates a face alignment module for use in a system for face recognition, according to an embodiment of the present invention.

According to an embodiment, face alignment models, including general purpose alignment models, global face alignment models and individual face alignment models, may be developed in alignment module 320. In another embodiment, face alignment models may be developed by or with the aid of alignment trainer 410, as shown in FIG. 4. The alignment trainer 410 of FIG. 4 is shown in the face alignment module 320, but other embodiments may place alignment trainer 410 in another location in the system. According to a further embodiment, face alignment models may be developed with information about facial feature points 312. According to another embodiment, these facial feature points may be labeled or annotated to identify certain points on a face or facial features. According to another embodiment, face alignment may be performed with information received from face detection module 310. In yet another embodiment, face alignments 370 may be stored or received from alignment and recognition storage 350.

Face alignment models may be developed in different ways. According to an embodiment, face alignment models may be developed using Active Shape Models (ASM). In another embodiment, face alignment models may be developed using Active Appearance Models (AAM). ASM and AAM are popular face alignment methods. ASM uses a local appearance model, which represents local statistics around each landmark or feature to efficiently find target landmarks. The solution space may be constrained by a properly trained global shape model. AAM combines constraints on both shape and texture. A result shape may be extracted by minimizing a texture reconstruction error. According to optimization criteria, ASM may perform more accurately in shape localization while AAM may give a better match to image texture.

ASM is composed of two parts: a shape subspace model and a search procedure. A shape subspace model is a statistical model for a tangent shape space. A search procedure uses local appearance models to locate target shapes in an image. Some efforts may concentrate on a search procedure, while others may focus on a subspace model. However, it is possible that these methods may only concentrate on general purpose face alignment (GPFA) and may not consider their higher-level tasks.

To train an ASM shape model, shapes may first be annotated in the image domain, according to an embodiment. In another embodiment, shapes are aligned in a tangent shape space with Procrustes Analysis. In a further embodiment, an ASM shape model may be trained by applying principle component analysis (PCA), which can be written as:

$$S = \bar{S} + \phi_t s \quad (1)$$

where $\bar{S}$ is the mean tangent shape vector, $\phi_t = \{\phi_1 | \phi_2 | \ldots | \phi_t\}$, which is a submatrix of $\Phi$ (the eigenvector matrix of the covariance matrix), contains the principle eigenvectors corresponding to the largest eigenvalues, and s is a vector of shape parameters. For a given shape, its shape parameter can be given by $$s = \phi_t^T (S - \bar{S}) \quad (2)$$

A search procedure may be performed with local appearance models, according to an embodiment. The local appearance models may describe local image features around each landmark. The local appearance model of each landmark may be modeled as the first derivative of the samples' profiles perpendicular to the landmark contour to reduce the effects of global intensity changes. They may be normalized by dividing by the sum of absolute element values. It may be assumed that the local models are distributed as a multivariate gaussian. For the jth landmark, we can derive the mean profile $\bar{P}_j$ and the covariance matrix $C_{Pj}$ from all the jth profiles of the training examples. The quality $F_j$ of matching the local appearance model to a sample profile $P_j$ in the image is given by $$F_j(P_j) = (P_j - \bar{P}_j)^T C_{Pj} (P_j - \bar{P}_j) \quad (3)$$

To reduce noise, PCA is applied, $$C_{Pj} = L \nabla L^T, P_j = \bar{P}_j + Lp \quad (4)$$

where, L is the eigenvector matrix, and $\nabla$ is the eigenvalue diagonal matrix. So, $$F_j(P_j) = (Lp)^T (L \nabla L^T)(Lp) = p \nabla p \quad (5)$$

Therefore, the local appearance model may be an appearance subspace model.

ASM may be performed to implement two kinds of class-specific face alignment methods: GLFA and IFA. According to an embodiment, ASM may be performed using GPFA, a traditional use of ASM. It may also be called GP-ASM. The training samples may come from a set of general persons which are not the persons to be recognized for face recognition. GP-ASM has the ability of generalization. However, it may lack the ability of specialization. Accordingly, GP-ASM may do well for all the persons in the general statistical sense, but it may not do very well for specific classes of persons. To deal with this problem, class-specific knowledge may be incorporated in ASM, according to another embodiment. There are two possible kinds of incorporation: global ASM (GL-ASM) and individual ASM (I-ASM). According to an embodiment, GL-ASM may use all the classes of persons to be recognized as the training samples for ASM. In some cases, GL-ASM may achieve better results because testing faces may also come from the training persons.

As previously stated, a second kind of incorporation is individual ASM (I-ASM). There are two ways to build an I-ASM model: semi-automatically and automatically. According to an embodiment, an I-ASM model may be built semi-automatically. Images are first labeled or annotated with the help of efficient tools, such as constrained search, and then an I-ASM model is built. According to another embodiment, an I-ASM model may be built for each individual. A straightforward way to build this may be to collect some samples for each individual and train the I-ASM model with these samples. For an AFR system, if images of each person are annotated during enrollment or registration, the I-ASM model could be built directly from these samples. In some cases, there should be enough variation of each individual, or the individual model may not generalize well to other faces of the same individual. According to a further embodiment, images may be manually or semi-automatically annotated with the help of constrained search and GP-ASM. According to another embodiment, face variation may be acquired for each individual. For example, in a BANCA database, each person may have images recorded with face variation by speaking some words.

According to another embodiment, an I-ASM model may be built automatically, without manual help. There may be some occasions where there are not enough images. In other cases, face variation may not be available. For example, in a FERET fafb database, there is only one image for each person. In this case, an I-ASM model may be automatically set up.

When only one face is available for each person, it may be difficult to allow for variation. In may also be difficult to locate new faces accurately, even for the same person. Therefore, this one-dimensional point or space may be expanded to a multi-dimensional space to allow for variation, according to an embodiment. According to another embodiment, both a shape subspace and an appearance subspace (local appearance) model may be expanded. The global variation of persons may be used as the variation of each person.

The global shape subspace is denoted by Equation (1), and we have only one shape $\bar{S}_I$ for a person and its parameter in the shape space $\bar{S}_I$, $$\bar{S}_I = \bar{S} + \phi_t \bar{s}_I \quad (6)$$

Subtracting Equation (6) from Equation (1), we have:

$$S - \bar{S}_I = \phi_t s - \phi_t \bar{s}_I = \phi_t (s - \bar{s}_I) = \phi_t s_I \quad (7)$$

where $s_I = s - \bar{s}_I$. Hence, $$S = \bar{S}_I + \phi_t s_I \quad (8)$$

Equation (8) shows that any shape S can be represented by a PCA shape space centered at point $\bar{S}_I$. As Equation (1) is a global shape space, it represents the variation of a set of faces. The most significant variations may be the global changes that apply to most of the faces. According to an embodiment, the first m eigenvectors $\phi_m$ with the largest eigenvalues from $\phi_t$ may be chosen to form a global change shape space for person $\bar{S}_I$, $$S_I = \bar{S}_I + \phi_m s_I \quad (9)$$

As a local appearance is also a PCA subspace model, an individual local appearance model for each landmark j may be, $$P_{jI} = \bar{P}_{jI} + L_n p_I \quad (10)$$

where $L_n$ is the first n eigenvectors with the largest eigenvalues from L.

FIG. 3 also shows signature extractor 330. Signature extractor 330 may be configured to extract signature features or signatures. According to another embodiment, signature extractor 330 may be configured to generate reconstruction errors. According to a further embodiment, signatures and reconstruction errors 390 may be stored in alignment and recognition storage 350. Signature extractor 330 may also receive signatures and reconstructions errors 390 from alignment and recognition storage 350. According to another embodiment, signatures and reconstruction errors 390 may be provided from signature extractor 330 to direct mixture recognizer 340. It may also be possible for direct mixture recognizer 340 to receive signatures and reconstructions errors 390 from alignment and recognition storage 350.

Figure 5:
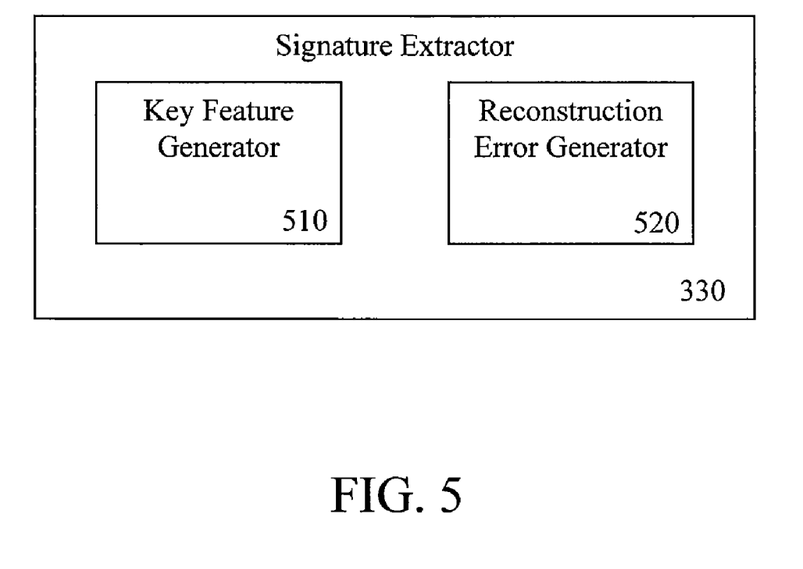
FIG. 5 illustrates a signature extractor for use in a system for face recognition, according to an embodiment of the present invention.

FIG. 5 shows signature extractor 330. According to an embodiment, signature extractor 330 may include key feature generator 510. Key feature generator 510 may be configured to generate key features. Key features may include points or key features of a face. Key features may also include signature features or signatures. According to another embodiment, key feature generator 510 may generate one or more key features based upon location of facial feature points 380 received from face alignment module 320.

Key features may include distinguishable features based upon discriminative face alignment. According to an embodiment, I-ASM may provide distinguishable features for face recognition based upon positions of key feature points. After alignment is performed, key feature points may be used to extract an image patch for recognition. I-ASM may provide accurate alignment or localization for faces corresponding to face alignment models developed from the same faces. Likewise, I-ASM may provide bad alignment or localization for other faces. As a result, key feature points may be distinguishable for different individuals.

Signature extractor 330 may include reconstruction error generator 520. Reconstruction error generator 520 may be configured to generate reconstruction errors. According to an embodiment, signature extractor 330 may generate any measurements that can determine how well face alignment is performed for a face. For example, it may be determined how likely a face alignment result is like a face. In a further embodiment, any other metrics or measurements may be generated or used to determine how well face alignment is performed. According to another embodiment, I-ASM may provide distinguishable features for face recognition based upon reconstruction error. According to another embodiment, texture reconstruction error may derive from a texture PCA subspace. In this case, the texture inside a shape may be modified. The texture inside a shape may also be warped to a mean shape. According to a further embodiment, textures from samples may be modeled with principle component analysis (PCA). This texture T can be written as:

$$T = \overline{T} + A_I t \quad (11)$$

where t is a vector of texture parameters, $T$ is the mean texture, $A_I = \{A_1 | A_2 | \ldots | A_I\}$, which is a submatrix of A (the eigenvector matrix of the covariance matrix), contains the principle eigenvectors corresponding to the largest eigenvalues, and t is a vector of texture parameters. For a given texture, its texture parameter may be given by $$t = A_I^T (T - \overline{T}) \quad (12)$$

The texture reconstruction error $Err_r$ of a given texture T is:

$$Err_r = |[\overline{T} + A_I(A_I^T(T-\overline{T}))] - T|^2 \quad (13)$$

If a face is aligned accurately by a shape, a texture inside the shape will likely be a face. In this case, a reconstruction error will be small. Otherwise, if a face is badly aligned, a texture inside the shape will likely not be a good face. Therefore, a reconstruction error will be large. As a result, a texture reconstruction error may also be a distinguishing feature.

Positions of key feature points are more related to a local structure model, and reconstruction errors are more related to a shape subspace. According to an embodiment, positions of key feature points may be used by a recognition algorithm to produce a recognition confidence. A recognition confidence may be a similarity, probability, score, or similar representative metric. Reconstruction errors are normally not used by traditional recognition algorithms, as they are not distinguishable with GPFA. According to another embodiment, individual face alignment (IFA) may be used, making a reconstruction error a distinguishing feature. In this case, a recognition confidence may be combined with a reconstruction error to produce a final recognition confidence. According to a further embodiment, signature extractor 330 may produce a confidence or confidence score. According to another embodiment, direct mixture recognizer 340 may also produce a confidence or confidence score.

FIG. 3 shows direct mixture recognizer 340. Direct mixture recognizer 340 may be configured to identify a face or a person by a face. Direct mixture recognizer 340 may be a recognizer, according to an embodiment. According to another embodiment, direct mixture recognizer 340 may be configured to cooperate with face alignment module 310 and signature extractor 330 to perform face recognition with discriminative face alignment. According to a further embodiment, direct mixture recognizer 340 may be configured to provide identification and confidence score 360.

Figure 6:
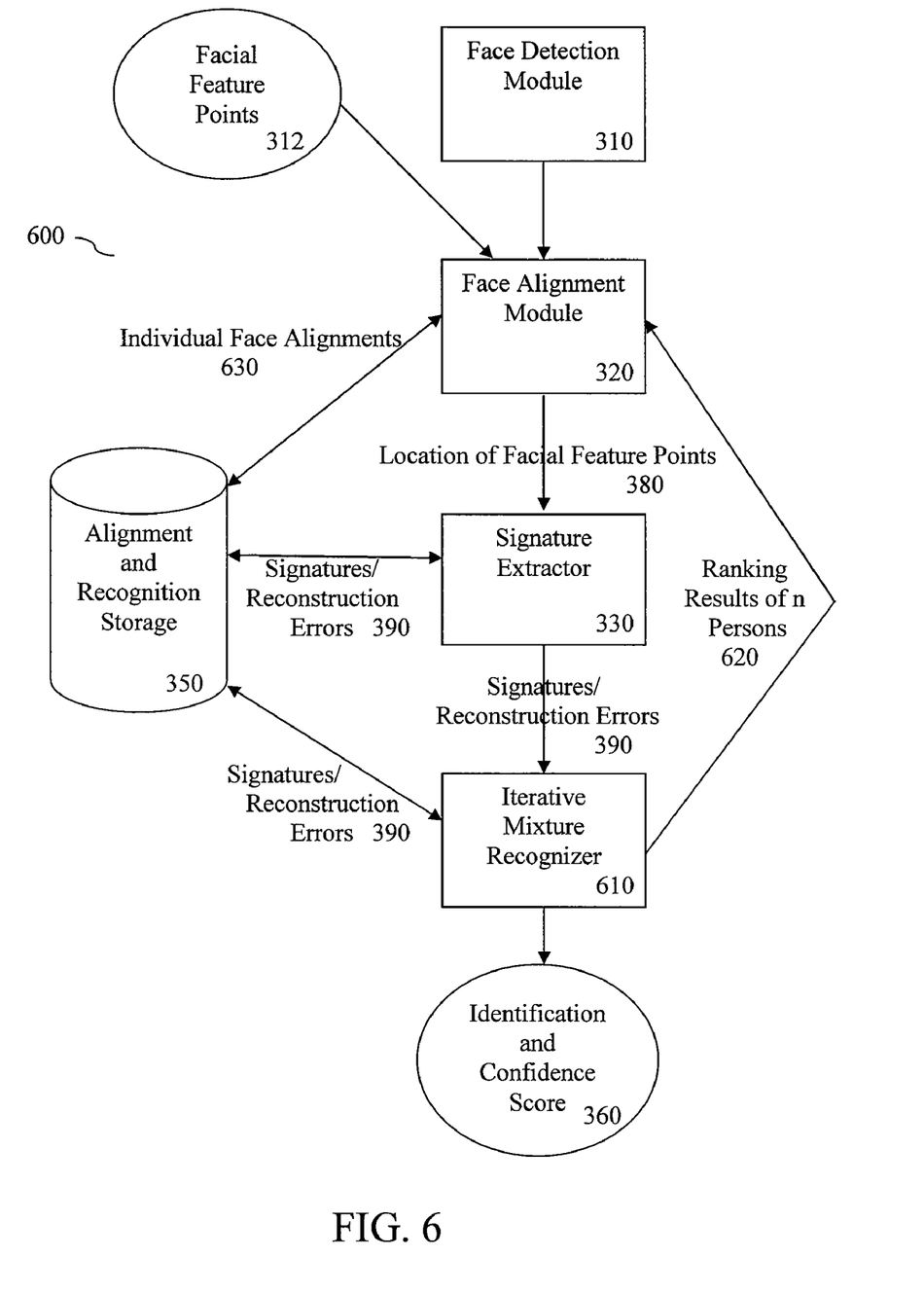
FIG. 6 illustrates a system for face recognition including an iterative mixture recognizer, according to an embodiment of the present invention.

FIG. 6 illustrates an exemplary system 600 for face recognition, according to an embodiment. System 600 shows face detection module 310, face alignment module 320, signature extractor 330, iterative mixture recognizer 610 and alignment and recognition storage 350. Face detection module 310 is configured to detect a face. Face alignment module 320 is configured to perform face alignment. Face alignment module 320 may also develop individual face alignments, according to an embodiment. According to another embodiment, alignment trainer 410 may develop individual face alignments. Alignment and recognition storage 350 may store or provide individual face alignments 630.

FIG. 6 shows signature extractor 330. According to an embodiment, signature extractor 330 may provide signatures. According to another embodiment, signature extractor 330 may provide reconstruction errors. According to a further embodiment, signature extractor 330 may include key feature generator 510. Key feature generator 510 may be configured to generate one or more key features. Key features may include signature features or signatures. Signature extractor 330 may include reconstruction error generator 520, according to another embodiment. Reconstruction error generator 520 may be configured to generate reconstructions errors. Signatures and reconstruction errors 390 may be provided to iterative mixture recognizer 610.

FIG. 6 shows iterative mixture recognizer 610. Iterative mixture recognizer 610 may be configured to identify a face or a person by a face. Iterative mixture recognizer 610 may be a recognizer, according to an embodiment. According to another embodiment, iterative mixture recognizer 610 may be configured to cooperate with face alignment module 310 and signature extractor 330 to perform face recognition with discriminative face alignment. According to a further embodiment, iterative mixture recognizer 610 may be configured to provide identification and confidence score 360.

Iterative mixture recognizer may also produce an individual alignment result ranking. An individual alignment result ranking may be based upon signatures and reconstruction errors 390. According to an embodiment, face recognition may be performed with the results of face alignment in a bottom-up way. Appropriate IFA models may be chosen based on the results of face recognition to further improve face alignment in a top-down way, further improving face recognition. In this case, face recognition may work in an iterative way. According to another embodiment, ranking results of n persons 620 may be provided to face alignment module 320. The process may be repeated starting with face alignment. Other iterations of this process may take place as necessary.

Figure 7:
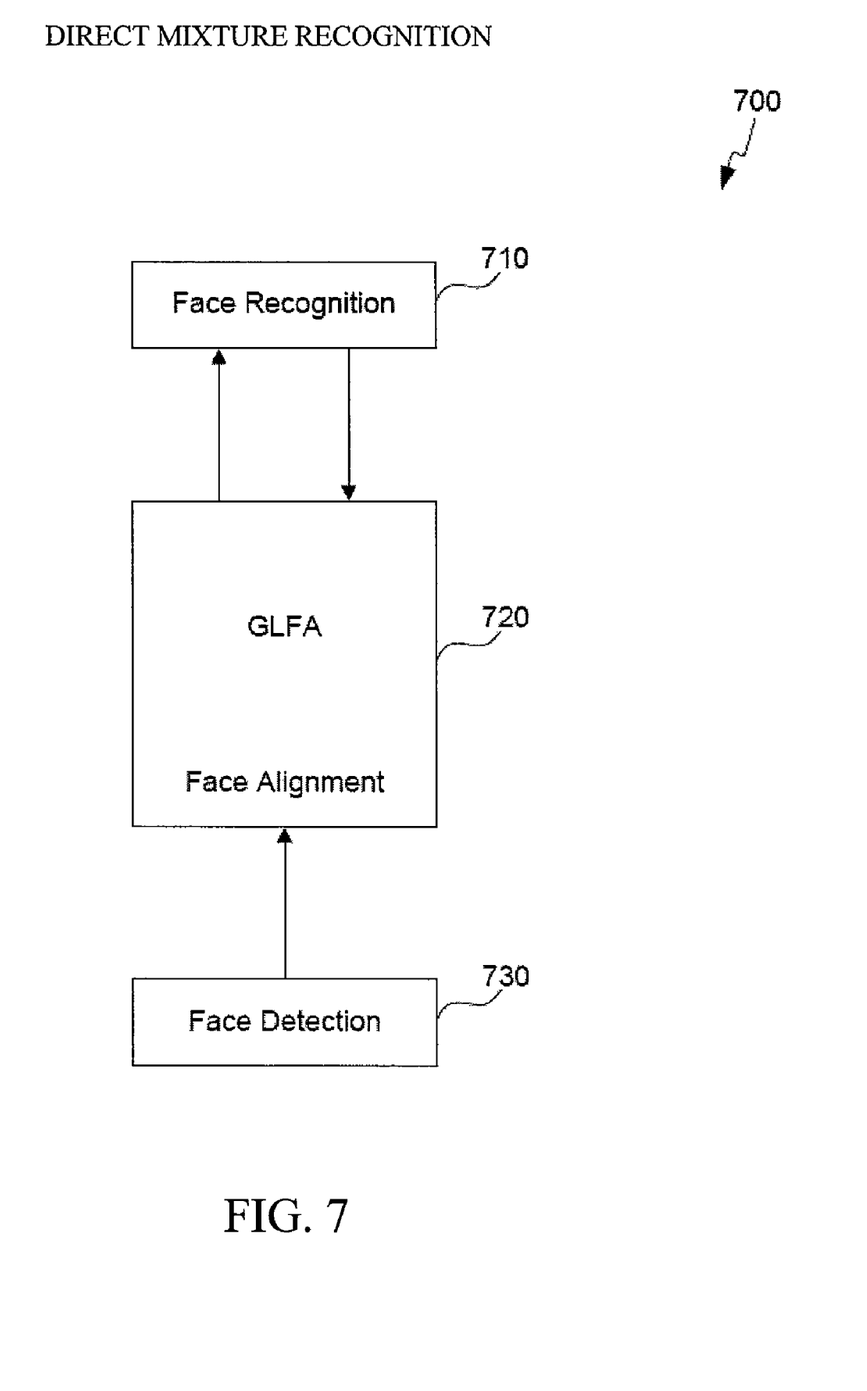
FIG. 7 shows a flowchart illustrating a method for face recognition including direct mixture recognition, according to an embodiment of the present invention.

Iterative mixture recognition may work similarly to direct mixture recognition. For example, direct mixture recognition is shown in exemplary method 700 in FIG. 7, according to an embodiment (710-730). Face detection 730 is first performed. Face recognition 710 and face alignment 720 may then work together as a mixture of top-down and bottom-up approaches. The embodiment shown by exemplary method 700 uses global face alignment (GLFA), incorporating knowledge of all persons to be recognized. Likewise, iterative mixture recognition is shown in exemplary system 800 in FIG. 8, according to an embodiment (810-830). Face detection 830 is first performed. Face recognition 810 and face alignment 820 then work together as a mixture of top-down and bottom-up approaches. However, iterative mixture recognition may have a different approach to incorporating knowledge of persons to be recognized than direct mixture recognition.

Figure 8:
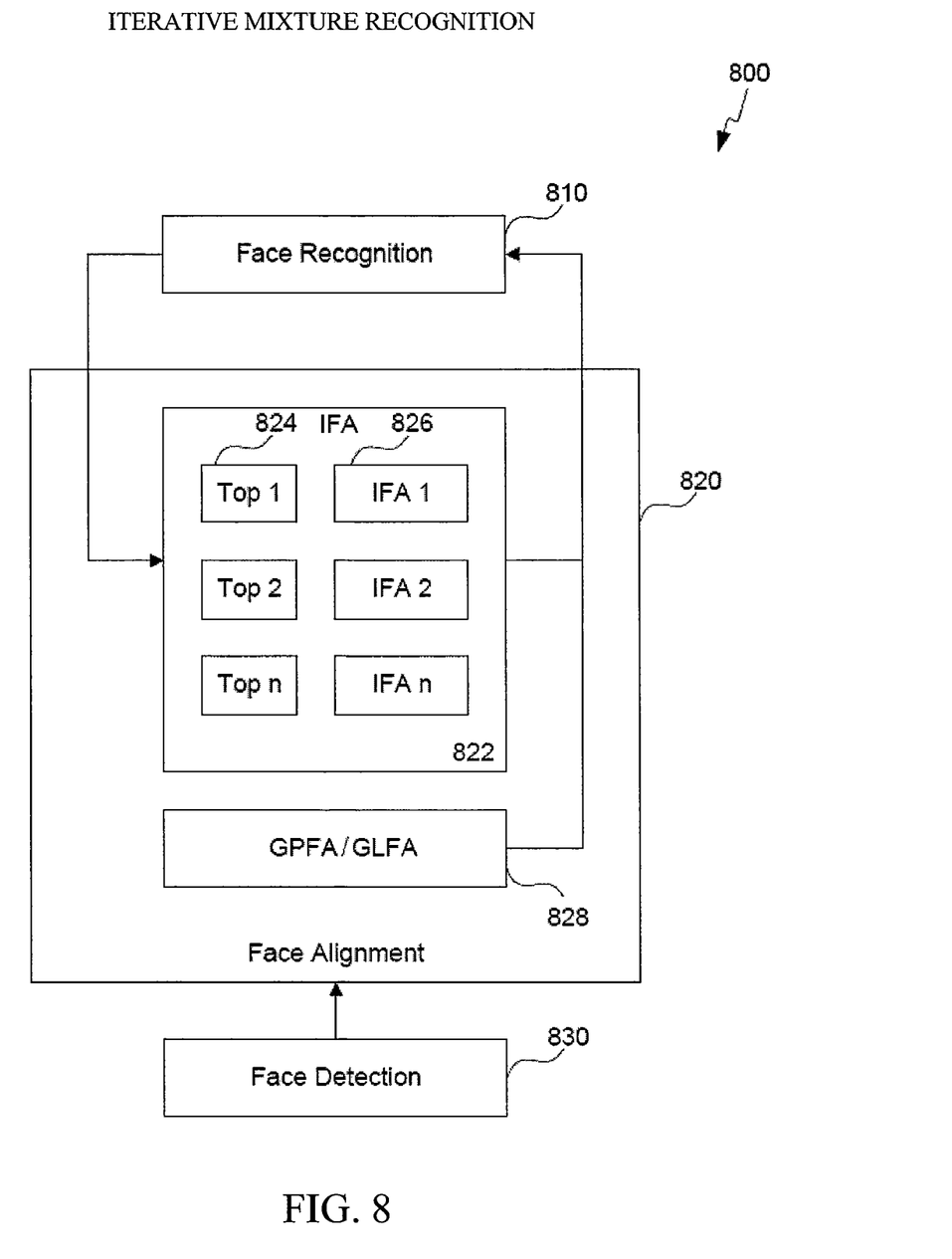
FIG. 8 shows a flowchart illustrating a method for face recognition including iterative mixture recognition, according to an embodiment of the present invention.

For example, according to an embodiment, a training process of the iterative mixture face recognition may label or annotate faces of an individual by employing constrained or automatic general purpose face alignment (GPFA). The process may also employ global face alignment (GLFA). Individual face alignment (IFA) models may also be built based upon annotation. Face alignment models may be trained using results of GPFA/GLFA 828 and IFA 822 respectively. According to another embodiment, a testing process may use GPFA to align a testing face. A face alignment model trained from results of GPFA/GLFA 828 may use GPFA or GLFA to recognize the testing face. The top n recognition results 824 may be selected. For example, the top n possible persons for this testing face may be selected as the n possible persons. The testing face may be re-aligned with the IFA models 826 from each of the possible persons. This may provide n face alignment results.

According to an embodiment, n face alignment results may be evaluated. The better of the n well-aligned results may be selected for refinement recognition. According to another embodiment, recognition may be refined. During refinement, the better of the n well-aligned results may likely be the results modeled with an IFA model of person i. If an alignment result is recognized as person i with refinement recognition, or person i is the top recognition result 824, person i may be called a recognition consistent person. According to a further embodiment, if there is only one recognition consistent person, the person is a recognition result, or identified.

There may be more than one recognition consistent person, according to another embodiment. For example, a recognition consistent person with the highest recognition confidence may have attained a recognition confidence that is high enough. In addition, a maximum number of iterations may have been reached. If this is the case, this recognition consistent person is the person that is identified. Otherwise, another n persons from the initial recognition result may be added to the possible persons. At this point, the process may return to the re-alignment step mentioned above. According to another embodiment, if there is no recognition consistent person and the maximum number of iterations has been reached, the top initial recognition result 824 will be the identification result. Otherwise, another n persons from the initial recognition result may be added to the possible person list and the process may return to the re-alignment step. This process may repeat for as many iterations as necessary.

Figure 9:
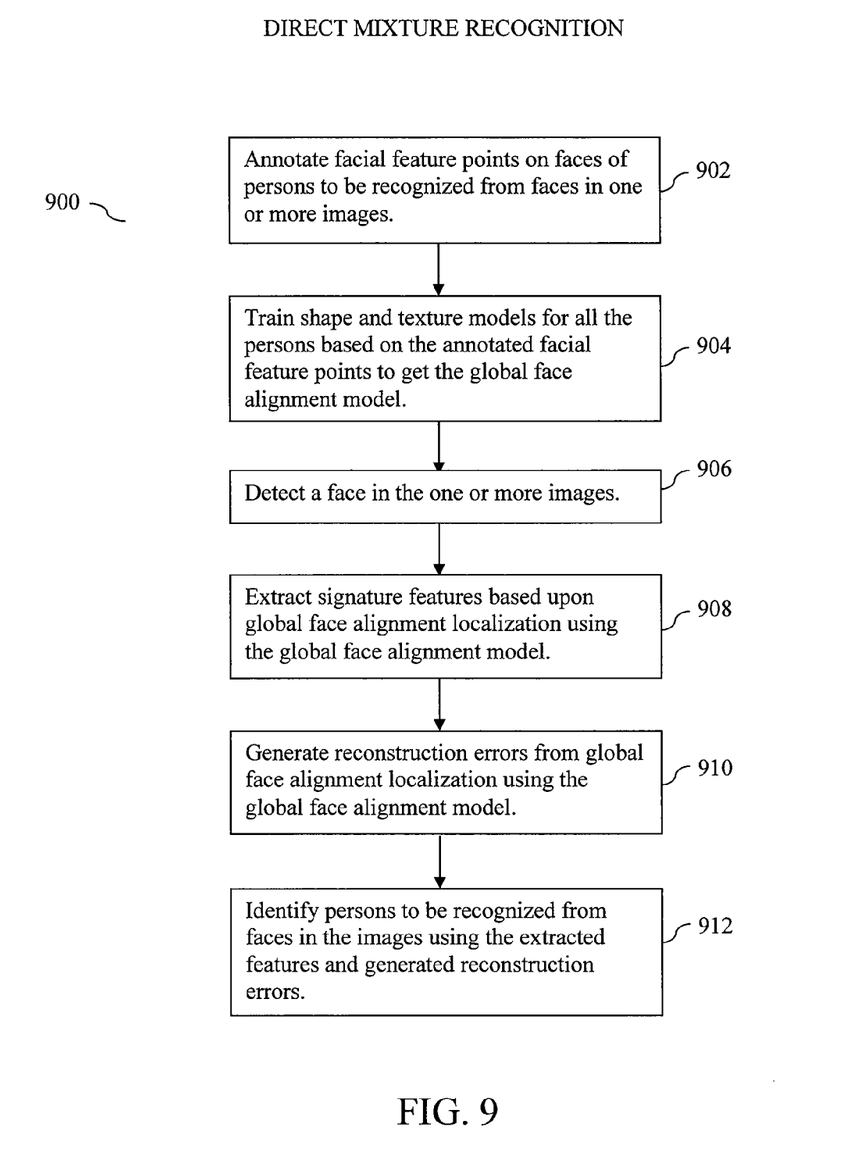
FIG. 9 shows a flowchart illustrating a method for face recognition including direct mixture recognition, according to an embodiment of the present invention.

FIG. 9 illustrates an exemplary method 900 for face recognition, according to an embodiment. Facial feature points on faces of persons to be recognized may be annotated in one or more images in step 902. Shapes may be trained and models may be textured for all persons based on the annotated facial feature points to get global face alignment models in step 904. This step may be performed by face alignment module 320. This step may also be performed by alignment trainer 410. In step 906, a face may be detected in one or more images. This may be performed by face detection module 310.

Signature features may be extracted in step 908 based upon global face alignment localization using the global face alignment models. This may be performed by signature extractor 330. This may also be performed by key feature generator 510. Reconstruction errors may be generated from global face alignment localization in step 910 using the global face alignment models. This may be performed by signature extractor 330. This may also be performed by reconstruction error generator 520. In step 912, extracted features and generated reconstruction errors may be used to identify persons to be recognized from faces in the images. This may be performed by direct mixture recognizer 340.

Figure 10:
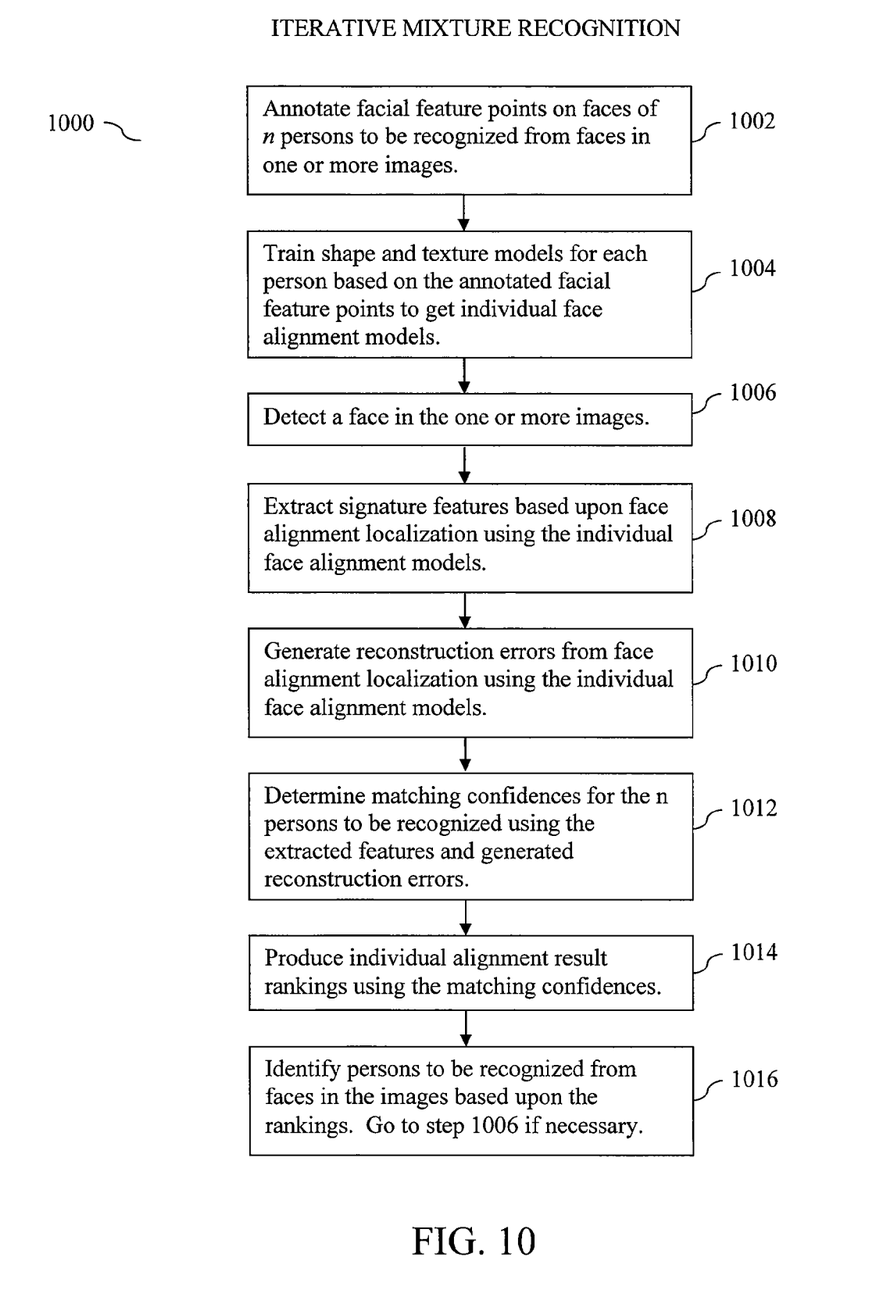
FIG. 10 shows a flowchart illustrating a method for face recognition including iterative mixture recognition, according to an embodiment of the present invention.

FIG. 10 illustrates an exemplary method 1000 for face recognition, according to an embodiment. Facial feature points on face of n persons to be recognized may be annotated in one or more images in step 1002. Shapes may be trained and models may be textured for each person based on the annotated facial feature points to get individual face alignment models in step 1004. This step may be performed by face alignment module 320. This step may also be performed by alignment trainer 410. In step 1006, a face may be detected in one or more images. This may be performed by face detection module 310.

Signature features may be extracted in step 1008 based upon face alignment localization using the individual face alignment models. This may be performed by signature extractor 330. This may also be performed by key feature generator 510. Reconstruction errors may be generated from face alignment localization in step 1010 using the individual face alignment models. This may be performed by signature extractor 330. This may also be performed by reconstruction error generator 520. In step 1012, extracted features and generated reconstruction errors may be used to determine matching confidences for the n persons to be recognized from faces in the images. Matching confidences may be used to produce individual alignment result rankings in step 1014. Persons to be recognized form faces in the images may be identified in step 1016 based upon the rankings. Steps 1012, 1014 and 1016 may be performed by iterative mixture recognizer 610. Steps 1006 through 1016 may be repeated as necessary. This may include passing rankings from iterative mixture recognizer 610 to face alignment module 320.

Aspects of the embodiments of the present invention, for example, system 300, system 400, system 500, system 600, method 700, method 800, method 900, and/or method 1000 or any part(s) or function(s) thereof may be implemented using hardware, software, computer program instructions recorded on a tangible medium to be executed by a processor, firmware, or a combination thereof and may be implemented in one or more computer systems or other processing systems. Though embodiments included herein may refer to human individuals or persons, the present invention is not limited to only human faces.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A facial recognition system comprising:
   a face alignment module configured to locate feature points of a face in at least one image using a face alignment model;
   a signature extractor, implemented by one or more processor-based devices, configured to generate at least one reconstruction error and extract signature features from the face in the at least one image; and
   a recognizer configured to identify a person from the face in the at least one image based upon a direct combination of the extracted signature features and the at least one reconstruction error.

2. The system of claim 1, wherein the face alignment module further comprises an alignment trainer configured to receive annotated facial feature points and produce the face alignment model.

3. The system of claim 2, wherein the received annotated facial feature points include facial feature points of at least one of a person or class of persons to be recognized.

4. The system of claim 1, wherein the signature extractor further comprises a key feature generator configured to extract signature features based upon face alignment localization using the face alignment model.

5. The system of claim 4, wherein the signature extractor further comprises a reconstruction error generator configured to produce a texture reconstruction error by modifying texture inside a shape.

6. The system of claim 5, wherein the texture reconstruction error is based upon how accurately the face is aligned by the shape.

7. The system of claim 5, wherein the reconstruction error generator is configured to use principle component analysis (PCA).

8. The system of claim 1, further comprising a storage device configured to store at least one of alignment information and recognition information.

9. The system of claim 1, wherein the recognizer is further configured to identify the person based upon a confidence score produced from the at least one reconstruction error and the signature features.

10. The system of claim 1, further comprising a face detection module configured to detect a face in the at least one image.

11. The system of claim 1, wherein the recognizer is a direct mixture recognizer configured to identify the person based on reconstruction errors and signature features generated from a global face alignment model and wherein the face alignment module is configured to develop the global face alignment model by training shape and texture models for a class of persons.

12. The system of claim 1, wherein the recognizer is an iterative mixture recognizer.

13. The method of claim 1, wherein the at least one reconstruction error is a distinguishing feature.

14. A method of face recognition comprising:
   extracting signature features of a face in at least one image based upon face alignment localization, wherein the extracting includes using a face alignment model;
   generating at least one reconstruction error based upon the face alignment localization, wherein the generating includes using the face alignment model; and
   identifying a person from the face in the at least one image based upon a direct combination of the extracted signature features and the at least one generated reconstruction error.

15. The method of claim 14, further comprising training shape and texture models based on annotated feature points of at least one of a person or class of persons in order to produce the face alignment model.

16. The system of claim 14, wherein generating the at least one reconstruction error further comprises modifying texture inside a shape.

17. The method of claim 16, wherein the generating at least one reconstruction error further comprises determining how accurately the face aligns with the shape.

18. The method of claim 14, wherein identifying a person further comprises producing a confidence score based upon the at least one reconstruction error and the signature features.

19. The method of claim 14, further comprising detecting a face in the at least one image.

* * * * *